T. Fairbanks,
Platform Scales,
№ 445, Reissued Mar. 31, 1857.
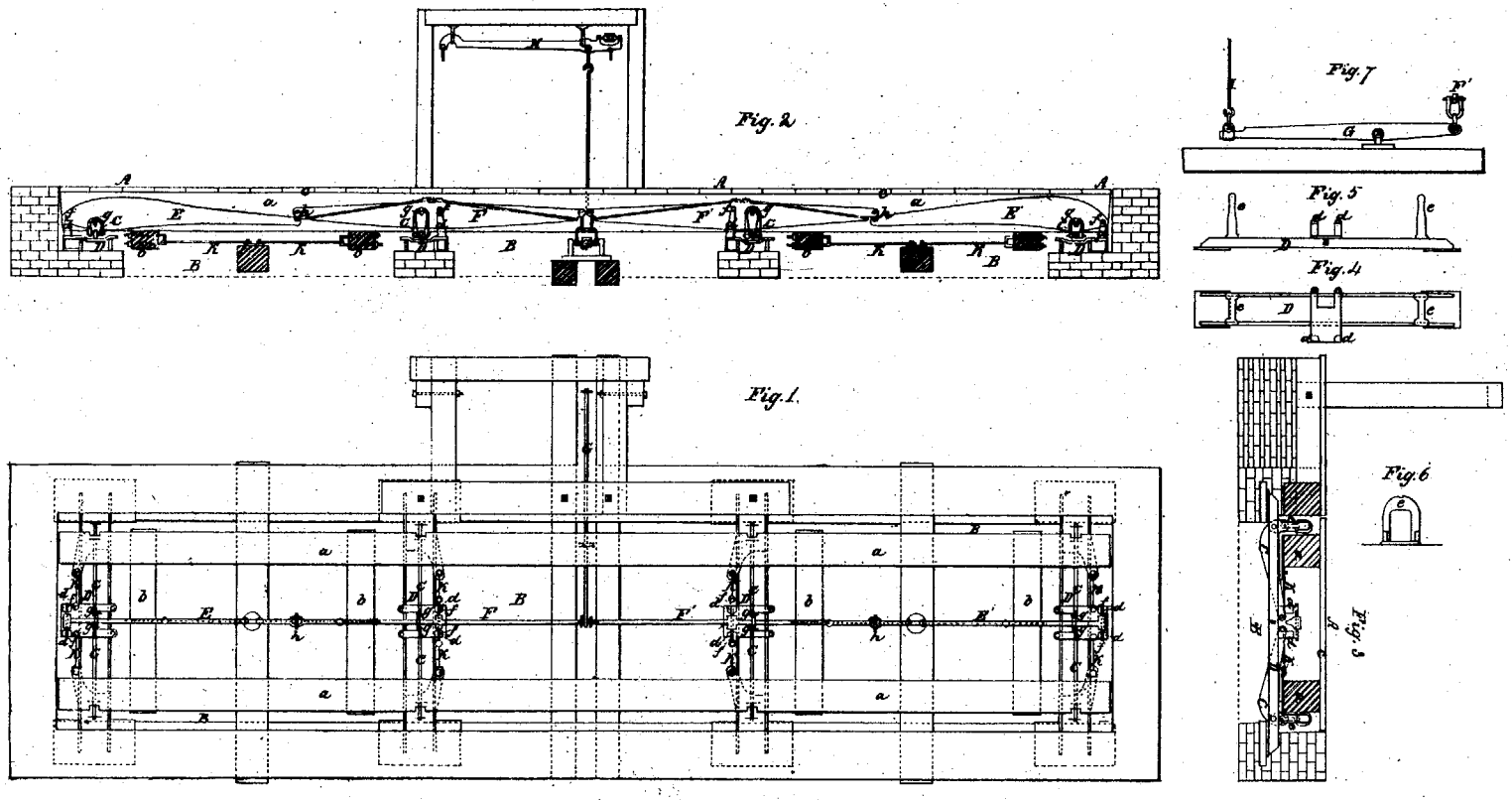

UNITED STATES PATENT OFFICE.

THADDEUS FAIRBANKS, OF ST. JOHNSBURY, VERMONT.

IMPROVEMENT IN PLATFORM-SCALES.

Specification forming part of Letters Patent No. 16,381, dated January 13, 1857; Reissue No. 445, dated March 31, 1857.

*To all whom it may concern:*

Be it known that I, THADDEUS FAIRBANKS, of St. Johnsbury, in the county of Caledonia and State of Vermont, have invented an Improved Platform-Scale for Weighing Railway-Cars, either alone or in train, or for various other useful purposes; and I do hereby declare that the same is fully described and represented in the following specification and the accompanying drawings, of which—

Figure 1 exhibits a top view of the framing and mechanism of said platform-scale; Fig. 2, a vertical and longitudinal section of the same. Fig. 3, a transverse section taken so as to exhibit one pair or set of the transverse bearing-levers. Fig. 4 is a top view of the arched frame or suspension-bridge of the bearing-levers. Fig. 5 is a side elevation of the same; Fig. 6, an end view of it. Fig. 7 will be hereinafter described.

In these drawings, A represents a long frame or platform, which is composed of horizontal stringers *a a*, united by cross-ties *b b*, and covered by a flooring, *c*, such flooring being generally omitted in Fig. 1, in order to show more conveniently the system of levers by which the platform is supported and operated. This platform is arranged within a pit or chamber, B, in the usual way, and is supported on several sets of multiplying bearing-levers, C C, which are arranged under the platform and in arched frames or suspension-bridges D D, as seen in the drawings, there being a set of two of said levers in each of said bridges, which are arranged within the pit and supported on its bottom by masonry or piers. Each of these frames I usually construct either of cast or wrought iron, and with bearings *d d* for the knife-edge fulcra of a longitudinal lever to rest upon; also with two arched standards, *e*, extending upward from its two ends and by the sides of a platform, A, as shown in the drawings.

To the arched standards of each suspension-bridge D, the two bearing-levers C C of said bridge are suspended at or near their outer ends, their inner ends being hung to knife-edge bearings *g g* of one of the longitudinal levers E or F, or E′ or F′. Each of said longitudinal levers has its knife-edge journals *f f* resting on the bearings *d d* of the suspension-bridge, and the knife-edge bearings *g g*, by which the bearing-levers are suspended to the said longitudinal levers, are arranged near to the fulcra of said levers, as shown in the drawings.

I would remark that each of the longitudinal levers F F′ has its fulcrum arranged at its middle, and therefore, in consequence of such an arrangement of its fulcrum and the arrangement of its knife-edge bearings which support the hanging loops of its bearing-levers C C, such lever F or F′ becomes not only a "multiplying" but an "equalizing" lever, the other two levers—viz., E E′—being multiplying-levers.

The terms "multiplying" and "equalizing" as applied to the levers, as well as the functions to be performed by such levers so constructed, will be readily understood by scale-makers. Each two levers E F E′ F′ are arranged with respect to each other and connected by a link, *h*, as shown in Fig. 2, each lever F or F′ being looped to the inner arm of a horizontal lever, G, extended at right angles to them, and connected to the steel-yard or weighing-lever H by a connection-rod, I. (Shown in Figs. 2 and 7, the latter being made to exhibit a side view of the said lever G.)

K K K are counter sway rods or chains, such as are generally used to prevent injurious longitudinal or lateral swaying of the platform.

When my improved apparatus is used for weighing railway cars or trains, its platform is to be furnished with rails and arranged in line with the railway-track, so that cars or carriages of the railway may pass on and off said platform.

The advantages to be derived from my peculiar arrangement of the longitudinal and bearing levers may be stated as follows: One great advantage consists in the facility with which the mechanism may be set up in consequence of its bearing-levers and their supporting-frames or suspension-bridges being arranged at right angles with respect to the longitudinal equalizing and multiplying levers.

The advantage of having an equalizing and multiplying lever in one bar, as described, is that by means of it the machinery may be readily adapted to a platform of any desirable length. I am aware, however, that the employment of an equalizing and multiplying lever is not new in platform-scales. Its use, however, in connection with the longitudinal and multiplying levers with which it is connected gives to the combination important advantages.

I am aware that it is not new to employ a series of transverse bearing and multiplying levers, and a multiplying-lever confined to a long longitudinal shaft, and an arm extended transversely therefrom, the inner ends of the bearing-levers being suspended from the shaft at one side of its axis, while such shaft rested on bearings applied on the other side of its axis. This is the arrangement and combination shown in the patent of Elnathan Sampson, granted July 25, 1854. My invention not only differs from the latter, but has important advantages over it, as it completely obviates the difficulty incident to the longinal shaft, and which prevents the apparatus from weighing correctly trains of varying lengths and large weights. The effect of torsion on such shaft is such as to bend its loop-supporting bearings more or less out of place, or their true position with respect to the supporting-bearings of the shaft. This in practice has been found to prevent the apparatus from weighing correctly, or at least renders it very uncertain for determining weights widely varying from each other. The bad results of the effects of torsion on so long a shaft as is required to extend underneath a platform capable of supporting a train of twenty or thirty railway-cars render a weighing apparatus depending on such a device of little or no practical value.

While the sets of transverse and multiplying levers C C C C secure advantages in supporting the platform, the longitudinal lever E and the longitudinal lever F (made so as to operate as an equalizing and multiplying lever) perform their duty correctly without any of the bad effects of torsion, and enable me to continue the system and platform to any desirable extent, producing thereby a scale which for railway purposes is perfect in its action, however great may be the difference of the loads weighed upon it.

The peculiar manner of constructing the suspension-bridge renders great strength to the supports of the bearing-levers, and also enables us to extend the arched standards up the sides of the platform, thus reducing the depth of the pit or the walls or frame thereof in comparison to what would be necessary were the standards arranged underneath the platform in the usual way. In connection with this arrangement the levers C C and their bearings are placed entirely below the platform, as seen in Fig. 3. Room is thus afforded between the timbers of the platform for the necessary vertical play of the longitudinal levers E F. Thus with the minimum of depth of pit we secure the necessary room for vertical play of the longitudinal levers.

I do not claim a combination of levers wherein four platform bearing-levers are multiplying-levers and radiate from one common center, and are there suspended to a multiplying-lever connected with an equalizing-lever, as I am aware that such is a common method of making a platform-scale. Nor do I claim the combination of a multiplying-lever, an equalizing-lever, and an equalizing and multiplying lever, as I am aware that such have been employed, and the platform thereof upheld by being made to rest directly on the first and last of said levers. This differs essentially from my combination and arrangement, as by such I am enabled to employ an additional series of levers—viz., the transverse levers C C C—whereby I gain an extra or manifold increase of leverage, and thus render the apparatus useful for determining the weights of railway-carriages. Nor do I claim the employment of a series of transverse and multiplying levers with a lever composed of a long longitudinal shaft and an arm arranged transversely and projecting from such shaft, the transverse bearing-levers of the platform being applied to the long shaft with reference to its axis, as above described; but

I claim—

1. My improved arrangement and combination of four bearing multiplying-levers, C C C C, a multiplying-lever, E, and a lever, F, made, as described, so as to act at the same time as an equalizing and a multiplying lever, the whole being applied to a steelyard weighing-lever by means substantially as set forth.

2. Arranging the suspension-bridge so that its arched standards shall extend upward by the sides of the platform and between it and the sides of the pit, in manner as stated, in combination with arranging the transverse levers C C and their bearings below the platform, the same affording the necessary room for the vertical play of the longitudinal levers, while it secures an advantage as regards the depth of the pit, as stated.

In testimony whereof I have hereunto set my signature.

THADDEUS FAIRBANKS.

Witnesses:
PLINY H. WHITE,
WM. W. THAYER.